(12) United States Patent
Kooi et al.

(10) Patent No.: US 7,148,860 B2
(45) Date of Patent: Dec. 12, 2006

(54) HEAD MOUNTED DISPLAY DEVICE

(75) Inventors: Frank Leonard Kooi, Ultrecht (NL); Rudolf Leopold Van Renesse, Den Haag (NL); Kees Moddemeyer, Leiden (NL)

(73) Assignee: Nederlandse Organisatie Voor Toegepastnatuurwetenschappelijk Onderzoek Tno (NL)

( * ) Notice: Subject to any disclaimer, the term of this patent is extended or adjusted under 35 U.S.C. 154(b) by 59 days.

(21) Appl. No.: 10/479,271

(22) PCT Filed: May 30, 2002

(86) PCT No.: PCT/NL02/00348

§ 371 (c)(1),
(2), (4) Date: Sep. 14, 2004

(87) PCT Pub. No.: WO02/097513

PCT Pub. Date: Dec. 5, 2002

(65) Prior Publication Data

US 2005/0017923 A1    Jan. 27, 2005

(30) Foreign Application Priority Data

Jun. 1, 2001    (NL) ................................. 1018198

(51) Int. Cl.
*G09G 5/00* (2006.01)
(52) U.S. Cl. ............................................. 345/7; 345/8
(58) Field of Classification Search ................. 345/7–9; 359/630–632; 348/115
See application file for complete search history.

(56) References Cited

U.S. PATENT DOCUMENTS

| 5,815,126 | A  | * | 9/1998 | Fan et al. ................... 345/8 |
| 6,396,497 | B1 |   | 5/2002 | Reichlen .................... 345/427 |
| 6,677,919 | B1 | * | 1/2004 | Saito ............................ 345/8 |
| 6,771,424 | B1 | * | 8/2004 | Amafuji et al. ............. 359/632 |

* cited by examiner

*Primary Examiner*—Richard Hjerpe
*Assistant Examiner*—Mansour M. Said
(74) *Attorney, Agent, or Firm*—Varnum, Riddering; John A. Waters

(57) ABSTRACT

A head mounted display device comprises a display which is imaged on the eye at an adjustable angle of incidence. On the basis of information about a position of the head of the wearer, the angle of incidence is controlled such that, upon movement of the head, the angle of incidence of the image moves along with that of the outside world.

11 Claims, 1 Drawing Sheet

HEAD MOUNTED DISPLAY DEVICE

The invention relates to a head mounted display device. A known form of a head mounted display device is a helmet with a display attached thereto. As the display is mounted on the helmet, the display moves along with the head of the wearer. As a result, it is possible, with a head mounted display, contrary to a free display such as a conventional monitor, to keep the image of the display constantly in front of the eyes of the wearer, independently of the position of the head of the wearer.

A known application of head mounted display devices is "virtual reality". In that application, a computer adjusts the contents of the image on the display to the position of the helmet, and hence to the direction in which the head of the wearer is turned. The computer does this in a manner such that the contents of the image correspond to what can be seen in that direction in a virtual world. The wearer thus gets the impression that he or she can look around him/herself in this virtual world.

This technique can also be used to make a virtual document visible to a wearer in a fixed direction. However, it has appeared that reading such documents proceeds considerably slower and has a strongly tiring effect. Such a head mounted display device is known from WO 97/20244. This device shifts the image on the display in response to orientation of the device. No mention is made of shifting the image of the display, rather than the image on the display.

An article by Fisher, titled "Variable acuity remote viewing system (VARVS), published in the proceedings of the National Aerospace and Electronics conference (NAECON) Dayton, May 16–18 1977, by the IEEE New York Vol 3 conf 30 on pages 1172–1179, describes the presentation of a high resolution image part to the fovea of the human eye. As is well known the fovea is area at the back of the eye where the eye has highest resolution. Normally, the orientation of the eyeball determines which part of the surrounding world is imaged onto the fovea. The projection system of Fisher has a high resolution part and Fisher strives to project this high resolution part from a direction that makes the eyeball image the high resolution part onto the fovea.

Most embodiments of Fisher do not use a head mounted screen and are therefore irrelevant for the present application. Fisher mentions only one embodiment that uses a head mounted display (FIG. 15). This embodiment apparently works under the assumption that the wearer will keep the eye direction fixed relative to the head during head movements, so that the same part of the image on the head mounted display remains imaged on the fovea. No mention is made of moving an apparent direction relative to the head mounted display along which the image of the screen is projected to the eye of the wearer.

One object of the invention is to provide a head mounted display device that has a less tiring effect.

The invention provides a head mounted display device provided with:
  a supporting frame for fastening the head mounted display device to the head of a wearer;
  a display for generating an image;
  imaging optics for imaging the image to an eye of the wearer;
  movement means for changing at least one angle of incidence at which the display is displayed via the eye;
  a position detector for measuring information about a position of the supporting frame; and
  a controlling coupling from the position detector to the movement means, arranged such that the movement means change the angle of incidence relative to the supporting frame in accordance with changes in the position of the supporting frame, so that the angle of incidence of the image falls on the eye while moving along with the outside world. The angle of incidence where the display is imaged can for instance be moved by moving the display relative to the supporting frame, or by adjusting the imaging optics.

The invention is based on the observation that the human eye tends to compensate in advance the effect of movements of the head. With a fixed eye position, a movement of the head would cause a displacement of the image of the environment on the retina. However, the eye involuntarily compensates for the head movement by making movements with an opposite effect. As a result, displacements resulting from head movements are normally compensated.

However, in a head mounted display device in which the display moves along with the head, the displacement is absent, or is suggested by change of the contents of the image. This latter occurs for instance in so-called virtual environments where a computer adjusts the image to the viewing direction of the user. Disadvantages of this method are that a computer is required and that the image compensation is accompanied by a delay and sometimes by image artifacts. Consequently still, a changing image is formed on the retina, which, particularly when reading documents, has a strongly tiring effect.

The invention is based on the insight that this effect can be prevented by providing that the angle of incidence at which the display is imaged on the eye relative to the outside world is fixed, independently of small head movements. This is realized with relatively small displacements of the display or small adjustments to the imaging optics (up to an angle of typically 5 degrees). Contrary to virtual reality applications, the content of the image on the display does not need to be adjusted.

The invention is particularly intended for "reading" documents, maps, etc., for which a focused action of the eye is required, generally in a limited image field. Naturally, displacing the display or adjusting the imaging optics is not a practically useful equivalent to the change of the contents of the image such as are necessary for compensating larger head movements (for instance through ninety degrees), for instance in virtual reality applications. This is because the display, by displacement thereof, would then be imaged only peripherally in the field of vision, or would even fall outside the field of vision. Insofar as there is a need to follow these head movements too, this will therefore have to be done by changing the contents of the image.

In principle, all sorts of head movements can be compensated, such as head movements which cause the image to move horizontally or vertically, and head movements which cause the image to rotate. Preferably, at least vertical movements are compensated. In practice, these are the most disturbing movements. In one embodiment, the device only compensates these movements. Thus, at low costs, the most annoying consequence of head movements is removed.

In one embodiment of the device, rapid changes in the angle of incidence are compensated, without compensating an average change of the angle of incidence over a longer period of time. Hence, the wearer of the device is not bound to a fixed viewing direction.

In one embodiment of the head mounted display device according to the invention, the movement of the angle of incidence is realized by displacing the display relative to the supporting frame. As an alternative, the imaging optics can be adjusted, for instance by using a prism with adjustable angle, or by shifting lenses in a manner known from movement compensating binoculars and/or cameras. However, moving the display is preferred, for one thing because changing decentering aberrations of the imaging optics are thereby avoided.

These and other advantages and objectives of the head mounted display device according to the invention will be further described with reference to the following figures.

Figure 1:
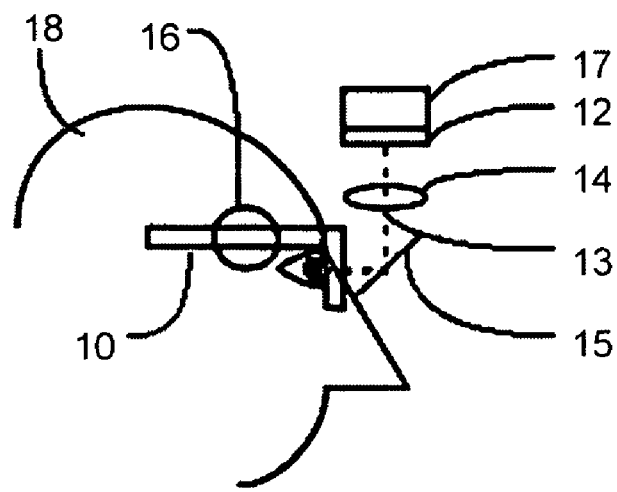
FIG. 1 shows a head mounted display device.

FIG. 1 shows a diagrammatic overview of a head mounted display device on the head of a wearer 18. The device contains a supporting frame 10, with which the device is fastened to the head 18, a display 12 movably attached on a bed 17, imaging optics 14, 15 and a position detector 16. The embodiment shown of the imaging optics 14, 15 is not essential to the invention. By way of example, a lens 14 and a mirror 15 are shown, which guide a light beam 13 from the display 12 to an eye of the wearer. The position detector 16 is coupled to the movement mechanism of the bed 17.

The image represented on the display comes, for instance, from a computer (not shown), and contains, for instance, an image of a document as produced by a text editor. However, the invention is not limited thereto: the image can also come, for instance, from video equipment (not shown), or be generated with computer graphics techniques. Such image sources need not form part of the head mounted display device and can also be placed detached from the supporting frame 10.

In principle, the head mounted display can contain two displays, one for each eye. Also, with the aid of an image splitter (for instance a semi transparent mirror) the same display can be imaged on both eyes. Further, an embodiment is possible in which the device images an image on one eye only.

Figure 2:
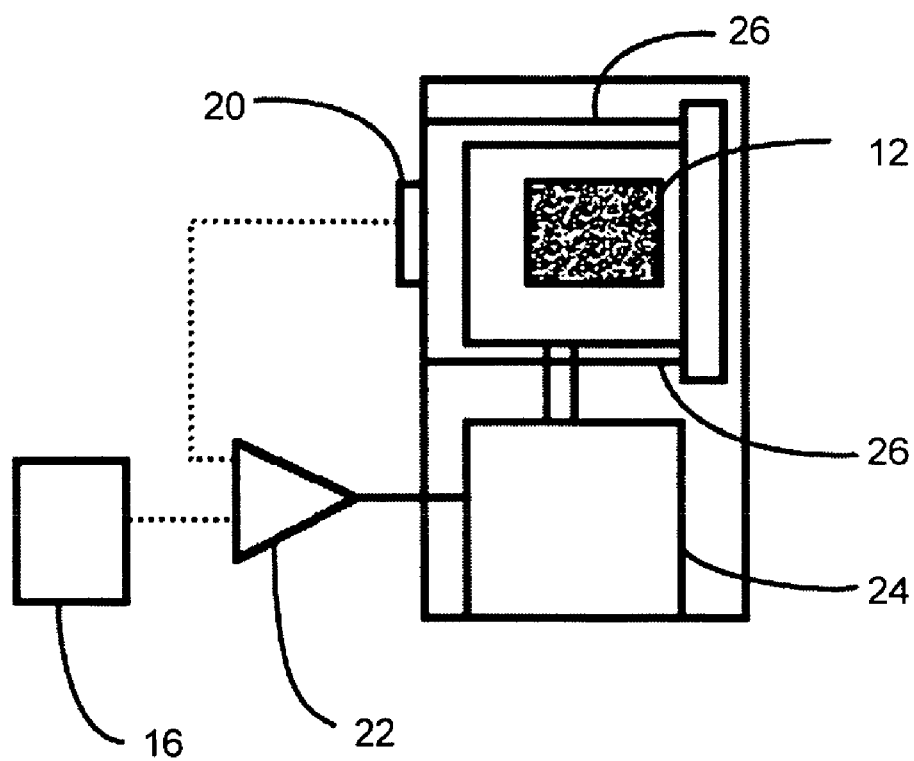
FIG. 2 shows a display movement mechanism.

FIG. 2 shows a display movement mechanism for movement of a display along one direction. The display 12, the position detector 16, a sensor 20, a controller 22, an actuator 24 and a guide 26 are shown. The guide 26 is fixed relative to the supporting frame 10 (not shown in FIG. 2). The actuator 24 is coupled to the display 12 for moving it back and forth relative to the guide 26. The sensor 20 is provided for measuring the displacement (i.e. for instance speed or acceleration) of the display 12 relative to the guide 26. The position detector 16 is arranged for measuring an angular displacement (for instance an angular velocity or angular acceleration) of the supporting frame relative to the outside world (which does not co-accelerate with the head movements). All sorts of angle detectors or angular acceleration detectors known per se are possible, such as detectors based on a gyroscope, or detectors for the earth's magnetic field. The measured angular displacements are fed from the sensor 20 and the position detector 16 to the controller 22, which, in turn, controls the actuator 24.

By way of illustration, the invention will be described for compensation of head movements whereby the head 18 moves in a direction such that the image moves vertically up and down.

Movements of the head causing the image to move in vertical direction cause the principal problems in the use of a head mounted display. For that reason, preferably, at least one movement mechanism is included for compensating movements in vertical direction. However, without departing from the invention, preferably also movement mechanisms are included to compensate movements in other directions, such as movements whereby the image moves in horizontal direction and/or whereby the image rotates. Further, also, the effects of translations of the head can be compensated, in case the impression is to be created that the image is at a particular distance (for instance a normal reading distance) from the head.

In operation, an image on the display 12 is imaged by the imaging optics 14, 15 via the eye of the wearer 18. By way of example, simple optics are shown. The optics include a lens 14, which forms an image of the display such that the eye, when focusing at a particular distance, for instance, infinity, sees the image sharply. Further, the optics include a mirror 15 which mirrors the image into the field of vision of the eyes of the wearer 18. Preferably, the mirror 15 is slightly transparent, so that the wearer 18 can also observe the surroundings beyond the mirror to some extent. In practice, more complicated optics can be used, depending on the need to mount the display 12 at a different location on the supporting frame 10, or to correct for optical imaging errors.

As the display 12 and the optics 14, 15 are fitted on the supporting frame 10, in principle, the image moves along with the movements of the head 18. The movement mechanism compensates this movement in at least one direction.

The position detector 16 detects angular accelerations of the supporting frame 10 in vertical direction, i.e. in the direction about an axis parallel to an axis between the ears (the "nodding axis"). In response to the detected accelerations, the controller 22 adjusts the position of the display 12.

In principle, there is a fixed factor between the displacement distance of the display and the change of the angle at which a point on the display is observed. This factor depends on the imaging optics. The controller 22 makes a comparison corrected for this factor between the angular acceleration of the supporting frame 10 as detected with position detector 16, and the acceleration of the display 12 as detected by sensor 20, and controls the movement of actuator 24 so that these accelerations, corrected for the factor mentioned, substantially correspond.

Consequently, the image of the display 12 remains in a fixed position in at least one direction (for instance the vertical direction) relative to the outside world. There is a constant angle between a horizon and the direction in which a light beam 13 falls on the eye from a fixed point on the display 12. Viewed from the wearer 18, the display therefore has a fixed position relative to the horizon. Hence, viewed from the wearer, the display moves or vibrates along with the horizon upon head movements. Through the involuntary compensation carried out by the eye for these head movements, the image of the display remains stably observable.

It is not necessary that the movement of the display compensates too great head movements, or that the average of the head movements over a longer period of time (i.e. the low frequency components of the head movement) is compensated. Major head movements occur less often than minor head movements. Accordingly, upon major movements, it is less important to be able to continue reading documents. In fact, for reading documents, it is preferable that the image is observed at a position on average straight in front of the head. The mechanism of FIG. 2 is arranged such that only higher frequency components of the head movement are compensated, in that control takes place based on accelerations.

In the embodiment shown, the difference in measured angular acceleration resulting from head movement and the measured acceleration of the display movement are controlled to zero. Consequently, the average of the angle at which the head is present will not be controlled to zero and, for rapid movements (for instance with movement frequencies above $1/3$ Hertz), a relatively small movement stroke of the display 12 will suffice, for instance corresponding to head movements of up to four or up to eight degrees. A similar effect is obtained by controlling to zero the difference in angular velocity or a combination of angular velocity and acceleration. It is even possible, however, to control angular differences to zero, albeit that this has the disadvantageous effect that, upon displacement of the head such that, on average, it looks in a different direction, the document is no longer averagely imaged in the most convenient viewing direction.

The combination of the controller 22 and actuator 24 does not need to react infinitely rapidly. A bandwidth for following movements with a frequency up to approximately five Hertz has proven quite sufficient. It is noted that this is much lower than the image refreshing frequency required for artifact-free observation of images. The reason for this is that only compensation of head movement is necessary that are not too rapid because of the relatively large mass of the head.

In the embodiment shown, a feedback loop is utilized for setting the position acceleration of the display. The loop gain determines the minimal frequency of the angular changes which are controlled to zero. Naturally, the invention is not limited to a feedback loop: also a feed forward system can be used with a comparable frequency characteristic, with which the detected angular changes directly control the position changes of the display. This latter has the advantage that the speed of response of the control becomes higher, as a result of which the display can be observed even more agreeably.

The embodiment shown shows provisions for displacement in one direction, namely for compensation of rotations of the head about an axis "from ear to ear". Naturally, without departing from the invention, comparable provisions can be provided for moving the display 12 in other directions and/or rotating it about an axis perpendicular to the plane of the display 12. Thus, displacements as a result of head movements other than about the axis from ear to ear can be compensated. To this end, the angle displacement sensor 16 is oriented for detecting rotations about the respective axis: an axis parallel to the neck of the user or an axis in the viewing direction of the wearer when he or she looks straight ahead.

In a further embodiment, provisions can be made for compensating head movements in more than one direction simultaneously. In this embodiment, on the supporting frame 10, several angular displacement sensors are included, for measuring angular displacements about the rotational axes involved. The measured angular displacements about these axes are used, respectively, to control the displacement of the display 12, for instance in horizontal and vertical direction and with pivotal movement of the display 12 about an axis perpendicular to the surface of the display, so that the change in angle of incidence and pivoting movements of the image as a result of rotations of the head are compensated.

Further, in one embodiment, also the effect of translations of the head can be compensated (and so not only of rotations). The effect of translations need not be compensated as long as the impression is to be created that the image of the display 12 is at infinity. But if the impression is to be created that the image is at a particular distance (for instance normal reading distance), then preferably also the effect of translations is compensated. This is for instance realized by also including translation sensors, and providing a calculating unit (for instance a microprocessor) which, on the basis of the measured rotations and translations of the head, calculates with elementary geometric formulas what would have to be the change of the angle or angles of incidence of a light beam of an object at a particular distance from the head. This calculated angle or these calculated angles of incidence will then be used to control the position and/or rotation of the display 12 in the manner as described hereinabove.

Although, in the embodiment shown, an angle sensor is utilized for detecting angular displacements of the head, it is also possible, for detecting these angular displacements, to use sensors for position (xyz) displacement, in combination with a calculating unit, such as a microprocessor. With the aid of elementary geometrical relations, such a calculating unit can calculate an angular displacement from the difference in displacement measured by two sensors for displacement in the same direction at different positions on the head (this concerns angular rotations about a normal to the plane through the connecting line between the sensors and the direction in which the displacements are detected). In the case that both a translation and a rotation of the head are to be measured, this can be done with such a pair of sensors.

Although the embodiment shown, in which the display 12 is moved relative to the supporting frame 10, is preferred, the movement of the image can also be realized in different manners, for instance by movement of the imaging optics, as by a rotating movement of the mirror, tilting or shifting of lenses, etc. Also, a prism with an adjustable wedge angle could be included in the optical path from the display 12 to the eye. Such prisms are known per se (Vary-Angle prism) and are realized, for instance, by means of two transparent plates, connected with a bellows, with a transparent liquid between the plates. However, it is preferred to move the display 12, because this obviates decentering aberrations in the imaging optics and because the mass of a miniature display is significantly smaller than that of an optic lens, so that a smaller and lighter mechanism can suffice.

The invention claimed is:

1. A self actuating head mounted display device, comprising:
   a supporting frame adapted to be worn on the head of a user and to thereby attach the head mounted display device to a head of a wearer;
   a display for generating an image, which display is operatively connected with the supporting frame;
   imaging optics for imaging the image via an eye of the wearer, which imaging optics are operatively connected with the supporting frame; and
   a display movement mechanism operatively connected between the supporting frame and the display whereby at least one angle of incidence at which the display is imaged via the eye is changed by the display movement mechanism;
   wherein the display movement mechanism includes a position detector that measures information about a position of the supporting frame, an actuator that changes the angle of incidence at which the display is imaged via the eye, and a controlling coupling operatively connected between the position detector and the actuator and arranged such that the display movement mechanism changes the angle of incidence relative to the supporting frame in accordance with changes in the position of the supporting frame, so that the angle of incidence of the image, moving along with the outside world, falls on the eye.

2. A self actuating head mounted display device according to claim 1, wherein the coupling is arranged to change the angle of incidence in response to changes in the angle of incidence with respect to the outside world in a higher frequency range, virtually without changing the angle of incidence in response to changes in a lower frequency range, so that an average of the angle of incidence in the longer term does not move along with the outside world.

3. A self actuating head mounted display device according to claim 2, wherein the head mounted display device is arranged to change the angle of incidence in only one direction, a direction corresponding to rotation about an axis from ear to ear of the user.

4. A self actuating head mounted display device according to claim 2, wherein the display movement mechanism is arranged for changing two angles of incidence relative to a first and second plane, respectively, which are not mutually parallel; the position detector is arranged for taking in information about angles of the supporting frame relative to the first and second plane; the controlling coupling is arranged such that the display movement mechanism changes the angles of incidence relative to the supporting frame in accordance with changes in the position of the supporting frame, so that the image falls on the eye at fixed angles relative to an outside world, virtually independently of the changes of the position of the supporting frame.

5. A self actuating head mounted display device according to claim 2, wherein the display movement mechanism is arranged for changing a rotation angle with which an axis in the display is imaged relative to an axis perpendicular to a viewing direction of the eye of the wearer; the position detector is arranged for taking in information about a rotation angle of the supporting frame relative to the viewing direction; the controlling coupling is arranged such that the movement means change the rotation angle relative to the supporting frame in accordance with changes in the rotation of the supporting frame, so that the image falls on the eye under fixed rotation relative to an outside world, virtually independently of the changes of the position of the supporting frame.

6. A self actuating head mounted display device according to claim 1, wherein the head mounted display device is arranged to change the angle of incidence in only one direction, a direction corresponding to rotation about an axis from ear to ear of the user.

7. A self actuating head mounted display device according to claim 6, wherein the display movement mechanism is arranged for changing two angles of incidence relative to a first and second plane, respectively, which are not mutually parallel; the position detector is arranged for taking in information about angles of the supporting frame relative to the first and second plane; the controlling coupling is arranged such that the display movement mechanism changes the angles of incidence relative to the supporting frame in accordance with changes in the position of the supporting frame, so that the image falls on the eye at fixed angles relative to an outside world, virtually independently of the changes of the position of the supporting frame.

8. A self actuating head mounted display device according to claim 6, wherein the display movement mechanism is arranged for changing a rotation angle with which an axis in the display is imaged relative to an axis perpendicular to a viewing direction of the eye of the wearer; the position detector is arranged for taking in information about a rotation angle of the supporting frame relative to the viewing direction; the controlling coupling is arranged such that the movement means change the rotation angle relative to the supporting frame in accordance with changes in the rotation of the supporting frame, so that the image falls on the eye under fixed rotation relative to an outside world, virtually independently of the changes of the position of the supporting frame.

9. A self actuating head mounted display device according to claim 1, wherein the display movement mechanism is arranged for changing two angles of incidence relative to a first and second plane, respectively, which are not mutually parallel; the position detector is arranged for taking in information about angles of the supporting frame relative to the first and second plane; the controlling coupling is arranged such that the display movement mechanism changes the angles of incidence relative to the supporting frame in accordance with changes in the position of the supporting frame, so that the image falls on the eye at fixed angles relative to an outside world, virtually independently of the changes of the position of the supporting frame.

10. A self actuating head mounted display device according to claim 9, wherein the display movement mechanism is arranged for changing a rotation angle with which an axis in the display is imaged relative to an axis perpendicular to a viewing direction of the eye of the wearer; the position detector is arranged for taking in information about a rotation angle of the supporting frame relative to the viewing direction; the controlling coupling is arranged such that the movement means change the rotation angle relative to the supporting frame in accordance with changes in the rotation of the supporting frame, so that the image falls on the eye under fixed rotation relative to an outside world, virtually independently of the changes of the position of the supporting frame.

11. A self actuating head mounted display device according to claim 1, wherein the display movement mechanism is arranged for changing a rotation angle with which an axis in the display is imaged relative to an axis perpendicular to a viewing direction of the eye of the wearer; the position detector is arranged for taking in information about a rotation angle of the supporting frame relative to the viewing direction; the controlling coupling is arranged such that the movement means change the rotation angle relative to the supporting frame in accordance with changes in the rotation of the supporting frame, so that the image falls on the eye under fixed rotation relative to an outside world, virtually independently of the changes of the position of the supporting frame.

* * * * *